United States Patent

Saad

(10) Patent No.: US 10,725,869 B1
(45) Date of Patent: Jul. 28, 2020

(54) DEDUPLICATION-BASED CUSTOMER VALUE

(71) Applicant: EMC IP HOLDING COMPANY LLC, Hopkinton, MA (US)

(72) Inventor: Yossef Saad, Gannei Tikva (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 407 days.

(21) Appl. No.: 15/280,812

(22) Filed: Sep. 29, 2016

(51) Int. Cl.
*G06F 11/14* (2006.01)
*G06F 3/06* (2006.01)

(52) U.S. Cl.
CPC ........ *G06F 11/1453* (2013.01); *G06F 3/0617* (2013.01); *G06F 3/0644* (2013.01); *G06F 3/0673* (2013.01); *G06F 2201/80* (2013.01)

(58) Field of Classification Search
CPC .. G06F 11/1453; G06F 3/0617; G06F 3/0644; G06F 3/0673; G06F 2201/80
USPC .......................................................... 707/692
See application file for complete search history.

(56) References Cited

U.S. PATENT DOCUMENTS

| | | | | |
|---|---|---|---|---|
| 8,595,198 B1 * | 11/2013 | Chamness | ............. | G06F 3/0619 382/232 |
| 8,954,399 B1 * | 2/2015 | Balakrishnan | .... | G06F 17/30159 707/692 |
| 9,454,321 B1 * | 9/2016 | Smaldone | ............... | G06F 3/061 |
| 2012/0060142 A1 * | 3/2012 | Fliess | ......................... | G06F 8/70 717/102 |
| 2012/0144149 A1 * | 6/2012 | Aronovich | .......... | G06F 11/3485 711/171 |
| 2013/0110793 A1 * | 5/2013 | Chavda | ............... | G06F 16/1752 707/692 |
| 2013/0268497 A1 * | 10/2013 | Baldwin | ............... | G06F 3/0604 707/692 |
| 2014/0006354 A1 * | 1/2014 | Parkison | ............... | G06F 3/0611 707/649 |
| 2014/0114932 A1 * | 4/2014 | Mallaiah | ............... | G06F 3/0608 707/692 |
| 2015/0213049 A1 * | 7/2015 | Kleiman | ............. | G06F 16/1752 707/692 |
| 2016/0078068 A1 * | 3/2016 | Agrawal | ............... | G06F 16/215 707/692 |

(Continued)

*Primary Examiner* — Hosain T Alam
*Assistant Examiner* — Nicholas E Allen
(74) *Attorney, Agent, or Firm* — Womble Bond Dickinson (US) LLP

(57) ABSTRACT

Embodiments are described for determining a customer value of a deduplication service. Customer data deduplication ratios are measured over a predetermined period of time in response to one or more events for a storage device. For each event, a deduplication ratio of customer data is stored in association with the storage device, customer ID, and configuration of the storage device. An event is an expiration of the predetermined period of time, or receiving notice of a configuration change of how the storage device is utilized by a customer. A configuration change can be adding or removing a virtual desktop, or adding or deleting one or more types of application data to/from the storage device. The storage deduplication statistics, configuration information are processed and sent to a storage service, with a storage device ID, and customer ID. A customer receives an analysis and statement of account from the storage service.

18 Claims, 9 Drawing Sheets

(56) References Cited

U.S. PATENT DOCUMENTS

2016/0246812 A1* 8/2016 Barajas Gonzalez ........................ G06F 3/0641

* cited by examiner

| | | Period from September 1, 2016 through September 30, 2016 | | | |
|---|---|---|---|---|---|
| Customer ID 505 | Storage ID 510 | Dept/App. 515 | Presented Data 520 | Raw Data 525 | Dedup % 530 |
| 535→ 123456 | 2347-FC2A-FDB1 | Email | 1.78 TB | 0.24 TB | 7.42:1 |
| 540→ 123456 | 2347-FC2A-FDB1 | Legal department | 24.70 TB | 8.03 TB | 2.88:1 |
| 545→ Total | | | 26.48 TB | 8.27 TB | 3.20:1 |

DEDUPLICATION-BASED CUSTOMER VALUE

TECHNICAL FIELD

This disclosure relates to the field of storing and backing up data of a client or host computer. More specifically, the disclosure relates to the field of determining value of a deduplication service to a customer.

BACKGROUND

In a deduplication storage system, presented data is data that is presented to the storage system, before deduplication. Raw data is the actual data stored after deduplication. A deduplication storage service vendor adds value to a storage system by the deduplication ratio that the deduplication storage provides. For data with a high deduplication ratio, such as 20:1, a customer can buy a storage system that stores, e.g., 1 TB of raw data, but 20 TB of presented data. Deduplication ratio varies with data types and data sets. For example, backing up an email system with some added messages since the last backup will have a high deduplication ratio because only the new messages need to be deduplicated whereas older messages can be referenced by pointers to the data. On the other hand, encrypted data—even if it is the same data as previously backed up—will have a low deduplication ratio.

Another factor that affects deduplication ratio is a change in configuration of how one or more storage devices are used by a customer or client device. For example, migration of a data set, such as a plurality of virtual desktops or a database, from a first storage device to a second storage device, can change the deduplication ratio of both the first and second storage devices. The first storage system may be heavily used while the second storage system is lightly used. To balance network traffic to the storage system and reduce storage latency, an administrator may wish to move some data sets to the second storage system. But, doing so may reduce the deduplication ratio of both the first and second storage systems and use more raw storage. This is especially true with, e.g. virtual desktops, because they are numerous and have a high deduplication ratio due to their similarity to one another.

A customer only wants to buy as much hardware (raw storage) as is needed, in view of the deduplication ratio of the customer's data. Deduplication adds value for a customer by allowing the customer to buy less storage capacity than the data presented for storage. Deduplication storage vendors could then lose revenue based on customers needing less raw storage. Deduplication storage vendors could charge for the amount of deduplication value added by the deduplication logic in the storage device. But, different customers have different data with different deduplication rates. Currently, there is not a system that determines the value of deduplication service to a customer that is based upon the actual deduplication value received by the customer, based upon customer-specific deduplication information. There also is not a system that determines the projected effect upon deduplication efficiency and storage usage in view of configuration changes to usage of one or more storage devices.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates, in block diagram form, an example deduplication-based customer value chart in accordance with some embodiments.

DETAILED DESCRIPTION

Figure 1:
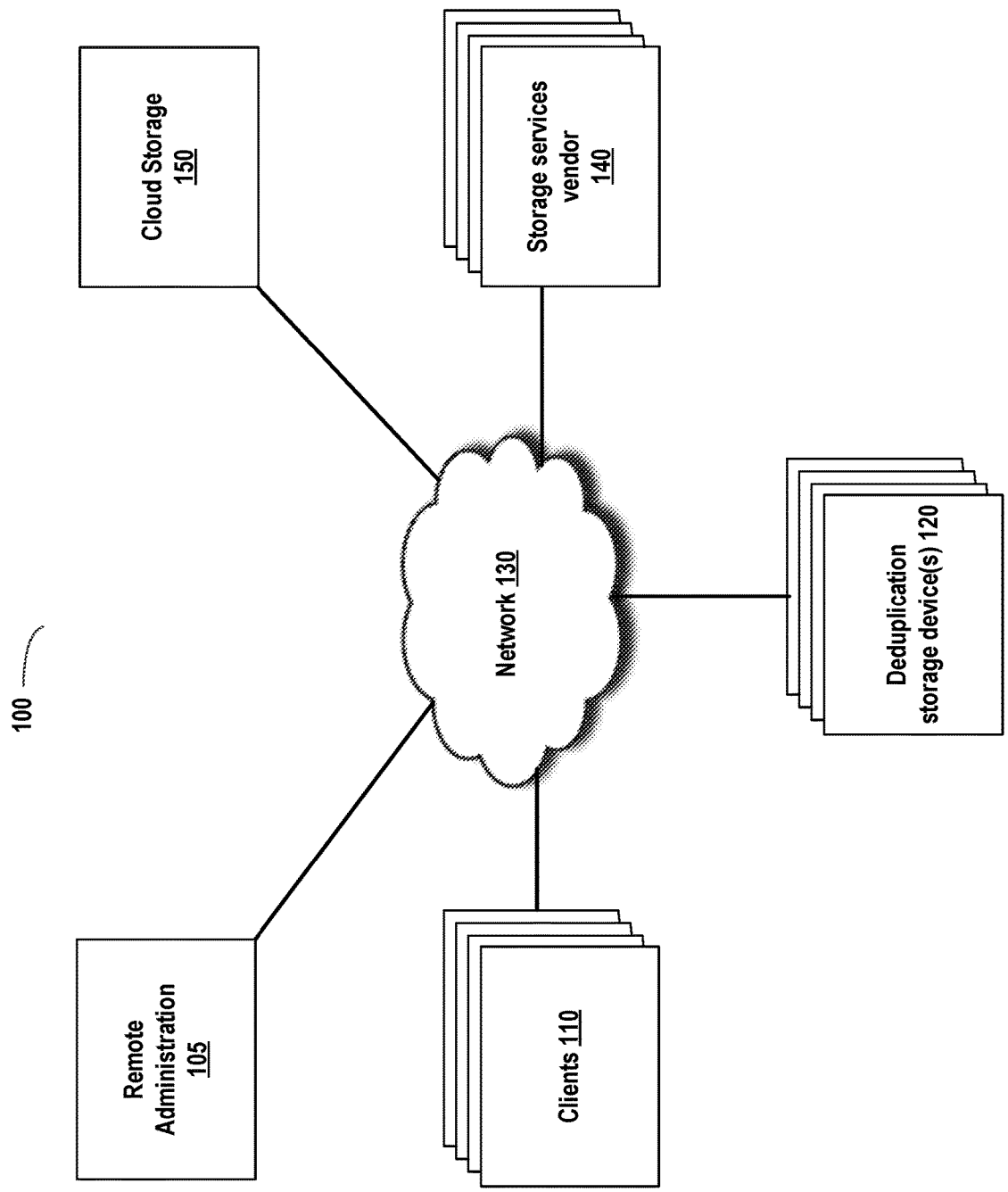
FIG. 1 illustrates, in block diagram form, an overview of a computing infrastructure that can determine a deduplication-based customer value of a storage system, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for determining a value to a particular customer of deduplication service provided by a storage device, independent of the cost of the physical hardware of the storage device. A storage device can receive "presented data" for storage or backup. The storage device can deduplicate and store the deduplicated presented data onto the storage device as "raw" data. During deduplication, the storage device can record deduplication statistics of the deduplicated data. Statistics can include an identification of the customer that owns the presented data, identification of a client device that generated the presented data, the amount of presented data, the amount of resultant raw data written to storage after deduplication, version information of the deduplication system, current configuration information of the utilization of the storage device by one or client devices of the customer (or a pointer to such data), and other information. A deduplication storage device can also maintain a record of changes in configuration information regarding usage of the storage device by one or more client devices.

A client device can include a storage monitor that can access the deduplication storage device information, including configuration information. The storage monitor can be a virtual machine. In an embodiment, the storage monitor can be implemented in hardware. In an embodiment, the storage monitor can be incorporated into the storage device, accessible to a client device by one or more calls to one or more application programming interfaces (APIs). Storage monitor can poll deduplication statistics and/or configuration information periodically, such as every hour or every day. At a predetermined increment, such as once per month, or once per quarter, storage monitor can transmit deduplication information and/or configuration information to a storage services vendor. The predetermined increment of time can comprise a billing cycle for deduplication services. Deduplication services can be billed on a "subscription" or a "utility" basis. A subscription basis can comprise debiting a prepaid credit amount of deduplication service units for the deduplication service received. Charge (or debit) for deduplication service is higher for a higher deduplication ratio, and can be lower for a lower deduplication ratio achieved for the customer or client device, based upon actual deduplication ratios achieved on the customer or client device data sets.

In an embodiment, storage monitor can receive configuration change information independent of polling for deduplication statistics. A configuration change to the usage of a storage device by a client device or customer can occur automatically, such as by a virtual machine manager automatically making a resource change to improve performance, or in response to a remote administrator making a configuration change for a customer or client device as to how the storage device usage is allocated. Storage monitor can transmit the configuration change information to a storage services vendor. Storage services vendor can determine a projected change in deduplication ratio, raw data storage used, and/or cost based upon the configuration change information.

Any of the above functionality can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of a computing infrastructure 100 that can determine a deduplication-based customer value of a storage system in accordance with some embodiments.

Computing infrastructure 100 can include one or more client devices 110 coupled via network 130 to deduplication-based storage device(s), storage services vendor 140, cloud storage 150, and remote administration client device 105.

Client devices 110 can be stand-alone computing devices that utilize deduplication storage device 120. Client devices 110 can also be a host computer 110 that hosts one or more virtual machines in a virtual computing architecture. In the description that follows, unless otherwise stated, client device 110 and a virtual machine running on a client device 110 are used interchangeably and may be referred to as "client." In an embodiment, a client device 110 can utilize deduplication storage device(s) 120 to supplement any local storage that may be accessible to client device 110. Alternatively, client device 110 may have no access to local storage on the client device 110 and can utilize deduplication storage device(S) 120 to store or backup data generated on client device 110. In an embodiment, client device 110 can alternatively, or in addition, utilize cloud storage 150 to store and/or back up data generated by client device 110. Client device 110 can include a deduplication storage device monitor that can access deduplication statistics generated by deduplication-based storage device 120. In a virtual embodiment, host device 110 can run a virtual machine version of the deduplication storage device monitor. Client devices 110 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Exemplary client device 110 hardware is described below with reference to FIG. 7.

Remote administration client device 105 can be used to monitor virtual machines running on client devices 110, make configuration changes to the virtual computing environment of a host computer, and receive notifications from client devices 110, deduplication storage device(s) 120, storage services vendor 140, and/or cloud storage service 150. Remote administration client device 105 can also be used to provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services. Remote administration client device 105 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Exemplary client device 110 hardware is described below with reference to FIG. 7.

Deduplication-based storage device(s) 120 ("storage device 120") can include a plurality of physical storage devices and can further include a deduplication storage engine that can deduplicate data presented to storage device 120, and store the deduplicated, presented data as raw data on a physical storage. Deduplication storage engine can also maintain statistics about deduplicated data, such as the size of a data set of presented data and the size of the raw data of the data set, after deduplication. Storage device 120 can include a storage monitor, similar to the storage monitor on a client device. In an embodiment, a storage monitor on storage device 120 can sample the deduplication storage statistics periodically, such as every hour or every day, or other interval, or in response to an event. The samples can be forwarded to duplication storage monitor of the client device or cloud service that generated the data set. A deduplication-based storage device 120 can comprise a large number of disks, such as EMC® VMAX 400K with up to 5,760 hard drives. In an embodiment, one or more deduplication-based storage devices 120 can form a part of a client device 110. In an embodiment, one or more storage devices 120 can be accessible, via network 120, as primary storage or backup storage for one or more client devices 110.

Network 130 may be any type of networks such as a local area network (LAN), a wide area network (WAN) such as the Internet, a fiber network, a storage network, or a combination thereof, wired or wireless.

Storage services vendor 140 can implement one or more servers to provide the functionality described herein. Exemplary storage services vendor 140 server hardware is described below with reference to FIG. 7.

Storage service vendor 140 can receive deduplication-based storage device 120 usage statistics and can provide to a client device 110, or remote administrator 105, information regarding the amount of deduplication service provided by the storage device 120. Storage services vendor 140 can also receive information regarding a change of configuration made on a client device 110 that may affect the value of deduplication service received from the storage device 120. For example, a client device 110 may be running may virtual desktops in a virtual computing environment. A virtualization software on the client device may automatically determine that the number of virtual desktops utilizing a particular storage device 120 is causing read/write or communication latency. The virtualization software on the client may automatically migrate a plurality of virtual desktops to a different storage device 120. Storage services vendor 140 can receive notification of such a configuration change and notify the client device 110, or remote administrator 105, or other designated client device 110, of the effect upon deduplication efficiency of the configuration change. Similarly, storage services vendor 140 can receive notification that a client device 110 has added a new application, such as a new database, and can notify the user of the projected effect upon deduplication efficiency of the added application.

Figure 2A:
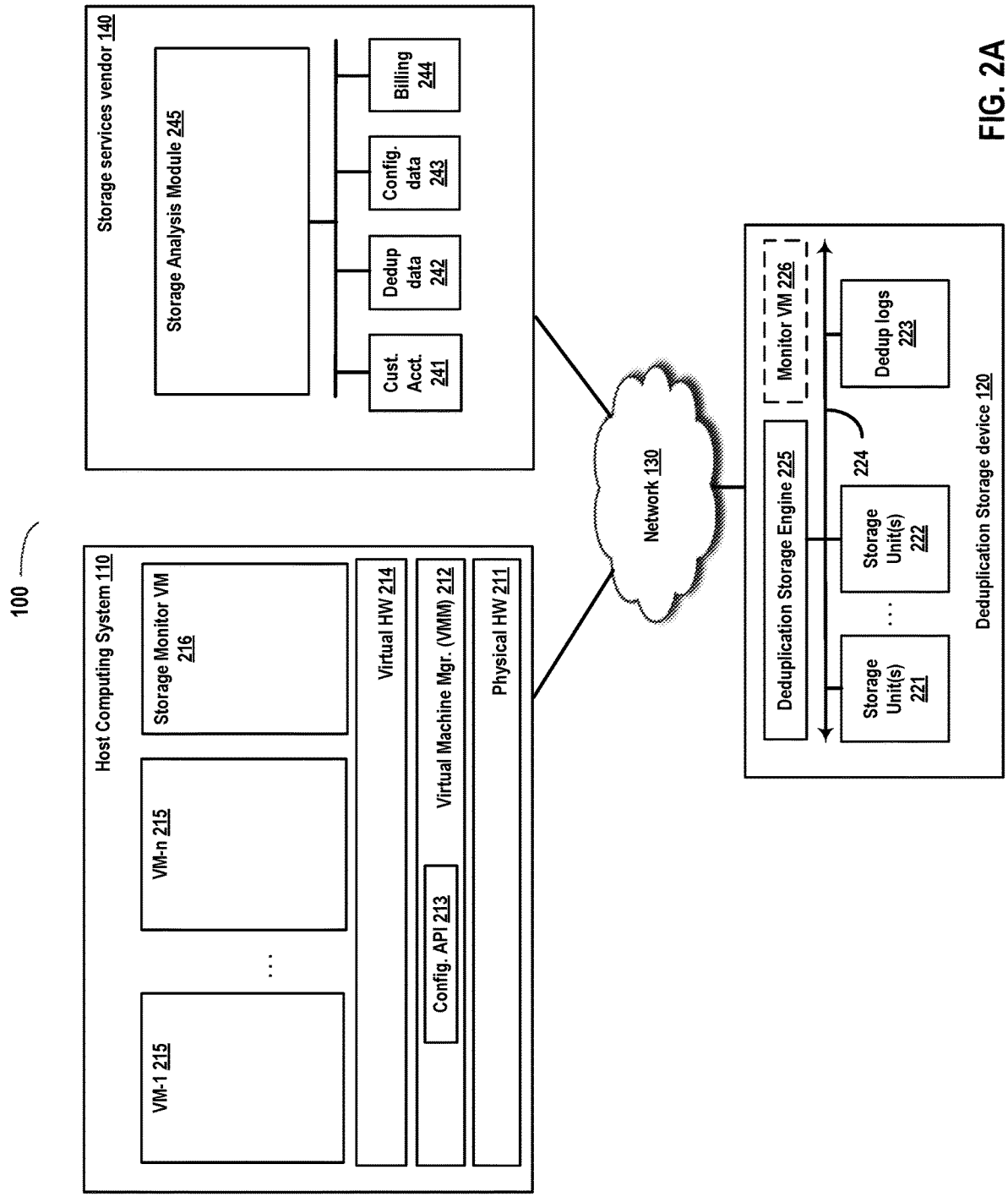
FIGS. 2A and 2B illustrate, in block diagram form, a detailed view of a computing infrastructure that can determine a deduplication-based customer value of a storage system, in accordance with some embodiments.
Figure 2B:
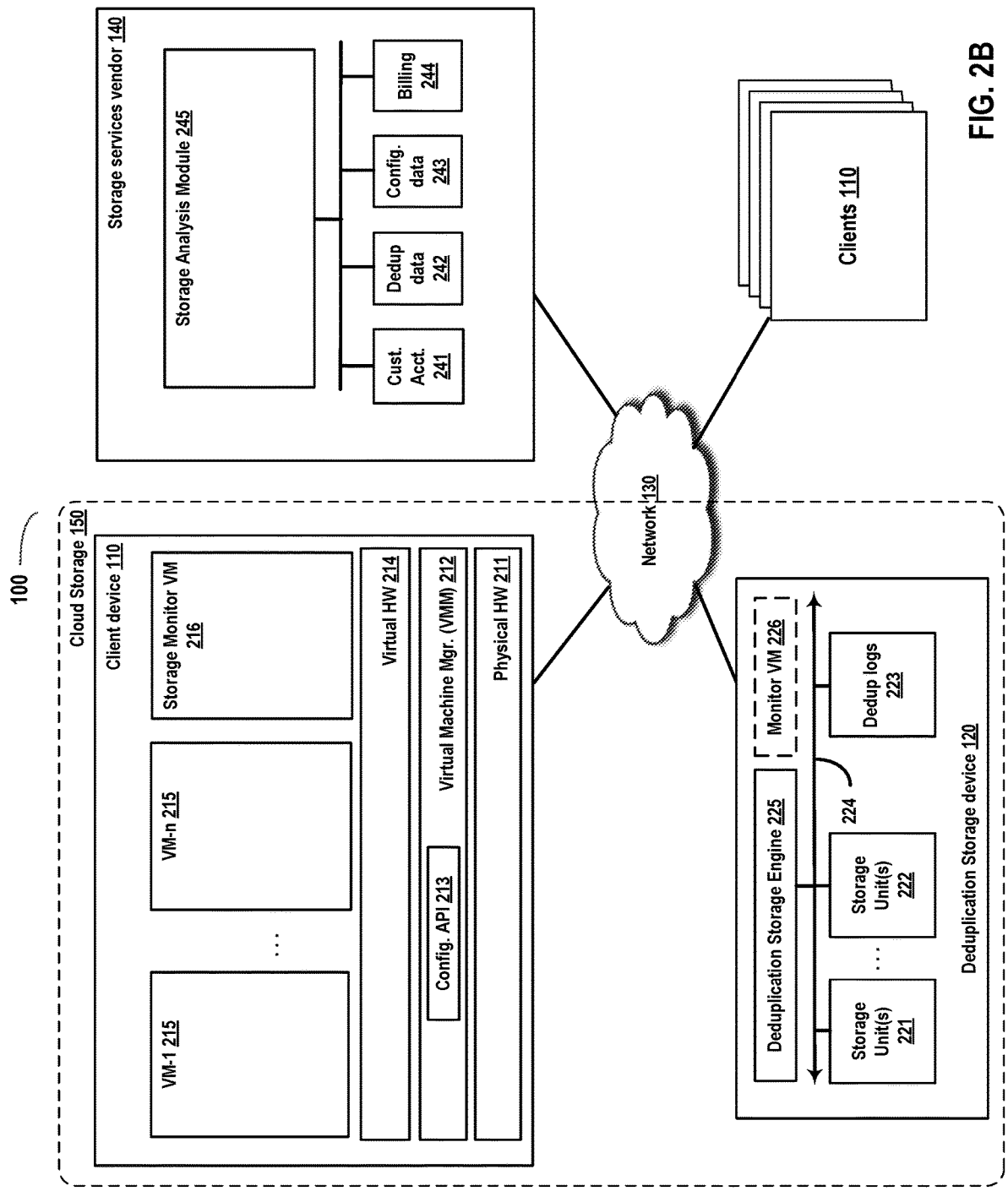

FIGS. 2A and 2B illustrate, in block diagram form, a detailed view of a computing infrastructure that can determine a deduplication-based customer value of a storage system, in accordance with some embodiments.

FIG. 2A describes a computing environment 100 wherein a client device 110, running a virtual computing environment, utilizes storage device 120 for storage. Client device 110 can use storage device 120 as primary storage or as backup storage.

Host computing system (client device) 110 can include physical hardware 211, a virtual machine manager 212, virtual hardware 214, and one or more virtual machines 215. Storage monitor 216, in this embodiment, can be implemented as a virtual machine. Virtual machine manager 212 can include configuration management tools that monitor the performance of the virtual computing environment on host computing system 110 and can automatically make resource utilization configuration changes as needed. Virtual machine manager 212 can also include a configuration application programming interface (API) 213 that can be called to make configuration changes or make inquiries about changes automatically made. Storage monitor VM 216 can access the configuration change information via VMM 212 or configuration API 213 to discover changes to configuration information. An exemplary API is described below with reference to FIG. 6. Storage monitor VM 216 can access deduplication statistics generated by deduplication storage device 120.

Deduplication storage device 120 can include a deduplication engine 225, a plurality of storage units 221 through 222, and a storage 223 for storing logs of deduplication statistics. Storage device 120 can also include a storage monitor VM 226 that performs analogous functionality as storage monitor VM 216 in client device 110. Storage units 221-223 may be implemented locally (e.g., single node operating environment) or remotely (e.g., multi-node operating environment) via interconnect 224, which may be a bus and/or a network. Deduplication engine 225 can receive data ("presented data") and can deduplicate the presented data. The deduplicated data is termed "raw data" that will be written to a storage unit 221-222. In one embodiment, one of the storage units 221-223 can operate as an active storage to receive and store external or fresh user data, while the other storage unit operates as a target storage unit to periodically archive data from the active storage unit according to an archiving policy or scheme.

Storage units 221-223 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 221-223 can also be combinations of such devices. In the case of disk storage media, the storage units 221-223 can be organized into one or more volumes of Redundant Array of Inexpensive Disks (RAID).

Deduplication logs 223 can be generated by deduplication storage engine 225 on a periodic basis, or in response to the happening of an event. An event can be, for example, completion of backup of a specified data set, or completion of backup of a specified amount of presented data, e.g. after 10 terabytes (TB) of presented data have been deduplicated and stored. Deduplication logs 223 can be generated on a periodic basis, e.g. once per day for a first client, and once per week for a second client. Frequency of deduplication data logging 223 can be customer-specific and can be based upon a backup or storage policy which may include a quality of service that indicates frequency of deduplication logging. In an embodiment, deduplication storage engine 225 can provide a notification to storage monitor VM 216 (or 226) that new deduplication log data is available. In an embodiment, deduplication storage engine 225 can provide deduplication log 223 data to storage monitor VM 216 (or 226) in response to a request from storage monitor VM 216 (or 226). A deduplication log 223 entry can include, but is not limited to, an identifier of a customer or client device 110 related to the logged entry, a date/time stamp, an indication of the application that generated the data being written or backed up, an amount of presented data received by the deduplication storage engine 225, and a resulting amount of deduplicated data ("raw data") written to storage, and the ratio of the presented data to the raw data. Storage monitor VM 216 (or 226) can obtain and store deduplication statistics at a first frequency, e.g. once per day. Storage monitor VM 216 (or 226) can then forward the statistics to storage services vendor 140 at a second frequency, e.g. once per month or once per quarter. In an embodiment, remote administrator client device 105, or storage services vendor 140, can request and receive deduplication statistics and/or configuration information from storage monitor VM 216 (or VM 226). Deduplication statistics provided to storage services vendor 140 can be used to generate a deduplication services customer-value that is reported to storage monitor VM 216, or to remote administrator client device 105, or other designated client device 110.

Network 130 can connect host computing device 110, deduplication storage device 120 and storage services vendor 120. Network 130 can be any type of network such as a local area network (LAN), a wide area network (WAN) such as Internet, a corporate intranet, a metropolitan area network (MAN), a storage area network (SAN), a bus, or a combination thereof, wired and/or wireless networks.

Storage services vendor 140 can comprise one or more servers that can analyze deduplication data received from a client device 110 or one or more virtual machines 215 ("client"). Storage services vendor 140 can further analyze configuration changes to a client to determine a projected effect upon the deduplication ratio of customer data resulting from the configuration change. For example, a first host computing device 110 may host several hundred virtual machines 215 that all are mapped to storage device 120. Latency of read/write and access times may increase due to the high number of virtual machines 215 accessing the storage device 120. Backup of virtual machine desktops may result in a very high deduplication ratio because of the similarity of virtual desktops to one another. A virtual machine manager 212 on host computing device 110 may automatically decide that half of the virtual desktops of host computing device 110 should be migrating to a second storage device 120. Migrating the desktops will result in lower latency at each storage device 120, but the deduplication of the virtual desktops will now be spread across the two devices, resulting in a lower deduplication ratio for each storage device 120 for the virtual desktops, thereby consuming more raw storage, split between the two storage devices 120. Storage services vendor 140 can receive a notification from storage monitor VM 216 of the migration of the virtual desktops to another storage device 120. Storage services vendor 140 can analyze the automatically generated configuration change (here, migrating desktops to another storage device 120), and notify storage monitor VM 216, or remote administration device 105, of the projected high use of raw storage, lower deduplication rate, and possible reduced latency of access.

Storage analysis module 245 can access storages 241-244 to analyze data received from storage monitor VM 216 (or 226). Storages 241-244 can include customer account data 241, deduplication data 242, configuration data 243, and billing information 244.

Customer account 241 storage can include a customer database that stores a customer identifier, an identifier of one or more storage devices 120 utilized or owned by a customer, identification of an administrator or account owner to receive billing information, and other information about one or more customers of storage services vendor 140.

Deduplication data 242 storage can store deduplication statistics reported by client device 110 storage monitor VM 216. In an embodiment, deduplication statistics can be reported by storage device 120 storage monitor VM 226. In an embodiment, deduplication statistics can be processed by storage monitor VM 216 (or 226) before being received by storage services vendor 140. Processing can include determining an average deduplication rate for a billing cycle, such as one month or 3 months. Processing can average a plurality of samples of deduplication data received by storage monitor VM 216 (or 226) over the billing cycle period.

Configuration data 243 storage can store configuration changes received from storage monitor VM 216, or received from virtual machine manager (VMM) 212, of a client device 110. Configuration changes can be used to analyze deduplication statistics received from client device 110 during a billing cycle in view of the configuration changes. In an embodiment, storage services vendor 140 can inform storage monitor VM 216, or remote administrator client device 105, of an actual or projected change in deduplication efficiency resulting from a configuration change. For example, if a large plurality of a customer's virtual desktops are migrated from a first storage device 120 to a second storage device 120, the deduplication ratio of the first storage device 120 and second storage device 120 may change as a consequence of the migration. In addition, the amount of raw data used may change as a consequence of the migration. Similarly, if data of a large database is migrated from a first storage device 120 to a second storage device 120, the deduplication efficiency and amount of raw storage used may also change. Storage services vendor 140 can report these changes to a customer.

Billing 244 storage can stored periodic billing information for deduplication services, and other storage vendor services, generated during a billing cycle and forwarded to a customer at an identified client device 110, remote administrator client device 105, other client device designated by a customer.

FIG. 2B describes a computing environment 100 in which client devices 110 may supplement their data storage requirements with cloud storage 150. Cloud storage 150 can include a client device 110, running a virtual computing environment, that includes a storage monitor VM 216. A customer having one or more client devices 110 may pay for access to cloud storage 150. In addition, the customer will also still pay for the deduplication service provided by storage device 120 within cloud storage 150. The amount paid for deduplication service can determined from the actual deduplication ratios attained for the customer's data generated by the customer's client devices 110, and as may be adjusted by cloud storage 150. Cloud storage 150 may mark-up, or discount, deduplication service separately from storage service vendor 140's computed costs. In this embodiment, cloud storage 150 client device 110 can perform the deduplication statistics collection and analysis on behalf of the client device 110 that generated the data stored on cloud storage 150.

Host computing system (client device) 110 of cloud storage 150 can include physical hardware 211, a virtual machine manager 212, virtual hardware 214, and one or more virtual machines 215. Storage monitor 216, in this embodiment, can be implemented as a virtual machine. Virtual machine manager 212 can include configuration management tools that monitor the performance of the virtual computing environment on host computing system 110 and can make configuration changes as needed. Virtual machine manager 212 can also include a configuration application programming interface (API) that can be called to make configuration changes or make inquiries about changes automatically made. Storage monitor VM 216 can access the configuration change information via VMM 212 or configuration API 213. An exemplary API is described below with reference to FIG. 6. Storage monitor VM 216 can access deduplication statistics generated by deduplication storage device 120 for each client device 110 of a customer.

Deduplication storage device 120 can include a deduplication engine 225, a plurality of storage units 221 through 222, and a storage 223 for storing logs about deduplication statistics. Storage device 120 can also include a storage monitor VM 226 that performs analogous functionality as storage monitor VM 216 in client device 110. Storage units 221-223 may be implemented locally (e.g., single node operating environment) or remotely (e.g., multi-node operating environment) via interconnect 224, which may be a bus and/or a network. Deduplication engine 225 can receive data ("presented data") and can deduplicate the presented data. The deduplicated data is termed "raw data" that will be written to a storage unit 221-222. In one embodiment, one of the storage units 221-223 can operate as an active storage to receive and store external or fresh user data, while the other storage unit operates as a target storage unit to periodically archive data from the active storage unit according to an archiving policy or scheme.

Storage units 221-223 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 221-223 can also be combinations of such devices. In the case of disk storage media, the storage units 221-223 can be organized into one or more volumes of Redundant Array of Inexpensive Disks (RAID).

Deduplication logs 223 can be generated by deduplication storage engine 225 on a periodic basis, or in response to the happening of an event. An event can be, for example, completion of backup of a specified data set, or completion of backup of a specified amount of presented data, e.g. after 10 terabytes (TB) of presented data have been deduplicated and stored. Deduplication logs 223 can be generated on a periodic basis, e.g. once per day for first client, and once per week for a second client. Frequency of deduplication data logging 223 an be customer-specific and can be based upon a backup or storage policy which may include a quality of service that indicates a frequency of deduplication logging. In an embodiment, deduplication storage engine 225 can provide a notification to storage monitor VM 216 (or 226) that new deduplication log data is available. In an embodiment, deduplication storage engine 225 can provide deduplication log 223 data to storage monitor VM 216 (or 226) in response to a request from storage monitor VM 216 (or 226). A deduplication log 223 entry can include, but is not limited to, an identifier of a customer or client device 110 related to the logged entry, a date/time stamp, an indication of the application that generated the data being written or backed up, an amount of undeduplicated data received by the deduplication storage engine 225 ("presented data"), and a resulting amount of deduplicated data ("raw data") written to storage, and the ratio of the presented data to the raw data. Storage monitor VM 216 (or 226) can obtain and store deduplication statistics at a first frequency, e.g. once per day. Storage monitor VM 216 (or 226) can then forward the statistics to storage services vendor 140 at a second frequency, e.g. once per month or once per quarter. Deduplication statistics provided to storage services vendor 140 can be used to generate a deduplication services customer-value that is reported to storage monitor VM 216, or to remote administrator client device 105, or other designated client device 110.

Network 130 can be connect host computing device 110, deduplication storage device 120 and storage services vendor 120. Network 130 can be any type of network such as a local area network (LAN), a wide area network (WAN) such as Internet, a corporate intranet, a metropolitan area network (MAN), a storage area network (SAN), a bus, or a combination thereof, wired and/or wireless networks.

Storage services vendor 140 can comprise one or more servers that can analyze deduplication data received from cloud storage 150 client device 110 or one or more virtual machines 215 ("client"). Storage services vendor 140 can further analyze configuration changes to a client to determine a projected effect upon the deduplication ratio storage resulting from the configuration change. For example, a cloud storage 150 may back and/or store data of a large plurality of virtual desktops of a customer client device 110 that are all mapped to a single storage device 120 of cloud storage 150. Latency of read/write and access times may have increased based on the high number of virtual machines 215 accessing the storage device 120. Backup of virtual machine desktops may be result in a very high deduplication ratio because of the similarity of virtual desktops to one another. A virtual machine manager 212 on a customer host computing device 110 may automatically decide that half of the virtual desktops of customer host computing device 110 should be migrated to a second storage device 120 of cloud storage 150. Migrating the desktops will result in lower latency at each storage device 120, but the deduplication of the virtual desktops will now be spread across the two devices, resulting in a lower deduplication ratio for each storage device 120 for the virtual desktops, thereby consuming more raw storage, split between the two storage devices 120. Storage services vendor 140 can receive configuration change information from cloud storage 150 client device 110 storage monitor VM 216 of the migration of the virtual desktops to another storage device 120. Storage services vendor 140 can analyze the configuration change (here, migrating desktops to another storage device 120), and notify storage monitor VM 216, or remote administration device 105, of the projected high use of raw storage, lower deduplication rate, and changed latency of access.

Storage analysis module 245 of storage services vendor 140 can access storages 241-244 to analyze data received from cloud storage 150 client device 110 storage monitor VM 216 (or 226). Storages 241-244 can include customer account storage 241, deduplication data 242, configuration data 243, and billing information 244.

Customer account 241 storage can include a customer database that stores a customer identifier, an identifier of one or more storage devices 120 utilized by a customer within cloud storage 150, identification of an administrator or account owner to receive billing information and other information about one or more customers of storage services vendor 140. In an embodiment, cloud storage 150 can be the customer of storage services vendor 140, in addition to, or instead of, customers of cloud storage 150. Storage analysis module 245 can provide analysis of deduplication ratios, projected deduplication ratios, and billing information to cloud storage 150 instead of, or in addition to, providing this information to client devices 110 that are the customers of cloud storage 150. In such an embodiment, cloud storage 150 may choose to place its own mark-up or discount on billing information provided to cloud storage 150 by storage services vendor 140.

Deduplication data 242 storage can store deduplication statistics of client devices 110 reported by cloud storage 150 client device 110 storage monitor VM 216. In an embodiment, deduplication statistics can be reported by cloud storage 150 storage device 120 storage monitor VM 226. In an embodiment, deduplication statistics can be processed by storage monitor VM 216 (or 226) before being received by storage services vendor 140. Processing can include determining an average deduplication rate for a billing cycle, such as one month or 3 months. The processing can average a plurality of samples of deduplication data received by storage monitor VM 216 (or 226) over the billing cycle.

Configuration data 243 storage can store configuration changes received from cloud service 150 client device 110 storage monitor VM 216, or received from virtual machine manager (VMM) 212 of a client device 110. Configuration changes can be used to analyze deduplication statistics received from client device 110 during a billing cycle in view of the configuration changes. In an embodiment, storage services vendor 140 can inform storage monitor VM 216, or remote administrator client device 105, of an actual or projected change in deduplication efficiency resulting from a configuration change. For example, if a large plurality of virtual desktops are migrated from a first storage device 120 to a second storage device 120, the deduplication ratio of the first storage device 120 and second storage device 120 may change as a consequence of the migration. In addition, the amount of raw data stored may change as a consequence of the migration. Similarly, if data of a large database is migrated from a first storage device 120 to a second storage device 120, the deduplication efficiency and amount of raw storage used may also change. Storage services vendor 140 can report these changes to a customer.

Billing 244 storage can stored periodic billing information for deduplication services, and other storage vendor services, that is generated during a billing cycle and forwarded to cloud storage 150, or directly to a customer of cloud storage 150, at an identified client device 110 or remote administrator client device 105.

Figure 3:
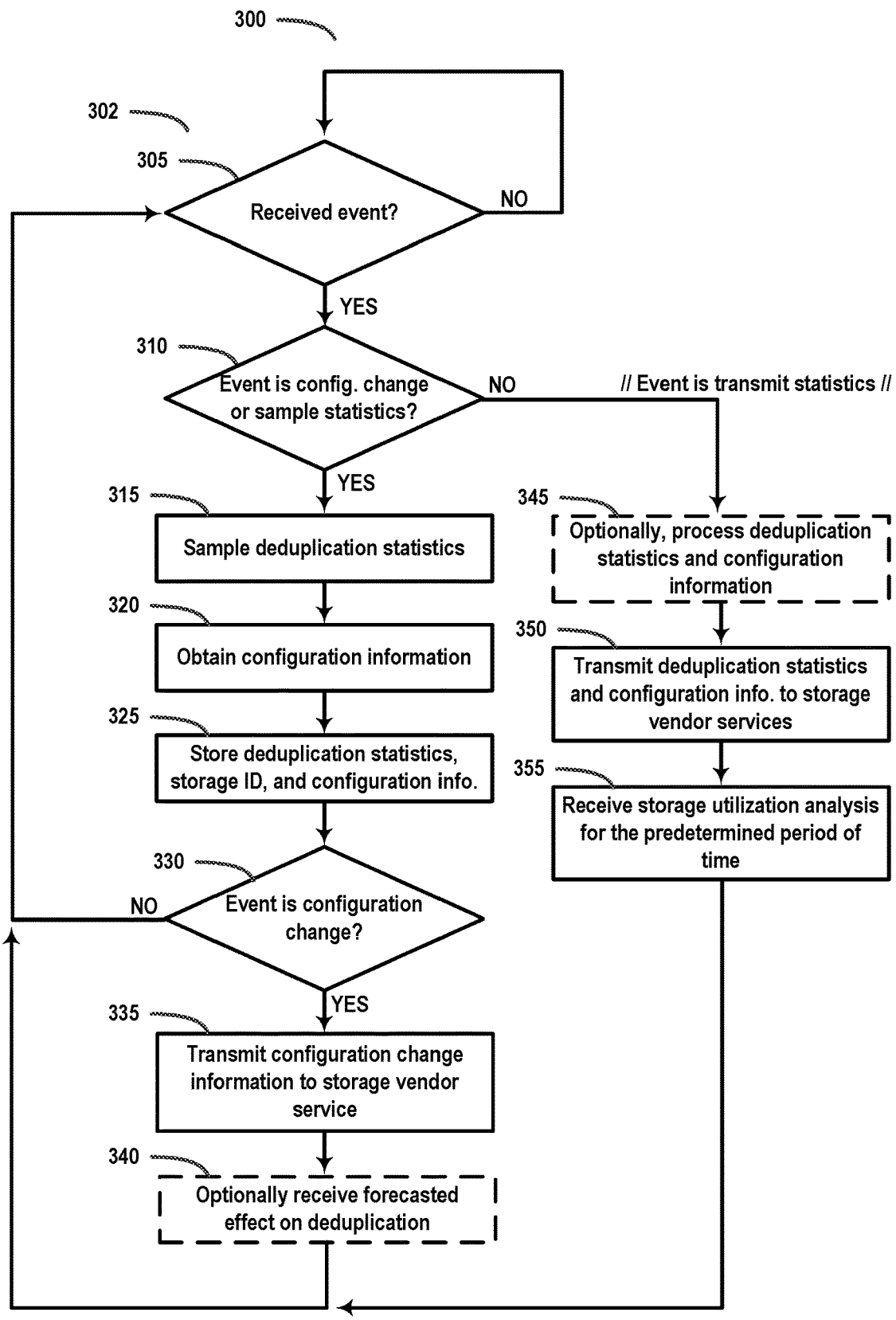
FIG. 3 illustrates, in block diagram form, a method of a client self-monitoring deduplication statistics to determine deduplication-based customer value of a storage system, in accordance with some embodiments.

FIG. 3 illustrates, in block diagram form, a method 300 of a client self-monitoring deduplication statistics to determine deduplication-based customer value of a storage system, in accordance with some embodiments. In a cloud storage 150 embodiment, a client device 110 of cloud storage 150 can monitor storage devices 120 within cloud storage 150.

In operation 305, it is determined whether storage monitor VM has received an event. An event can be a change of configuration event, a sample deduplication statistics event, or a transmit statistics event. A sample statistics event can be triggered by an expiration of a predetermined time period indicating that it is time to sample deduplication statistics of storage device 120, e.g. 1 hour, 1 day, or other sample interval. The sample interval can vary between customers and/or client devices 110 of a customer. The sample interval can be determined by a quality of service agreement, system tuning parameters, or other metric. A transmit statistics event can be triggered by an expiration of a predetermined period of time, e.g. 1 month or 3 months. In an embodiment, a transmit statistics event can be determined a service agreement and can be tied to a customer or client device 110 billing cycle. A configuration change event can be triggered by a notification of a configuration change to storage device 120 utilization. Notification may be received from client device 110 virtual machine manger 212, a remote administrator client device 105 making a configuration change, or other notification source for a change in configuration of storage device 120 utilization. A configuration change can include, e.g., adding or deleting a data set for storage or backup by storage device 120. A configuration change can be a change to storage or backup policy or quality of service that may change a frequency of storage of data, a medium to which data is stored, a duration which data is stored, how many storage devices 120 are to be used to perform storage or backup of a data set, or a specification as to a particular storage device 120 that is used to backup or store a particular data set. If no event is received, operation 305 can loop until an event is received. In an embodiment, the loop can have a time interval, such as every 1 second, 1 minute, an hour, or other time interval. If an event is received, method 300 continues at operation 310.

In operation 310, in can be determined whether the event was a configuration change event or a sample statistics event. If the event was a sample statistics event or configuration change event, then method 300 continues at operation 315. Otherwise method 300 continues at operation 345.

In operation 315, storage monitor VM 216 can sample deduplication statistics of storage device 120. Deduplication statistics for each data set can include an identification of the customer or client device 110 that owns or generated the data set, an amount of presented data in the data set, an amount of raw data stored for the data set after deduplication, and a time stamp of the statistics.

In operation 320, storage monitor VM 216 can obtain configuration information related for a customer, or for one or more data sets of a client device 110. Configuration information can include a current mapping of a VM 215 to the storage device, mapping of particular application data sets to the storage device 120, quality of service or frequency of back information as described above, and other information that relates to deduplication of data sets on behalf of client devices 110 of customers. In an embodiment, obtaining configuration information can include obtaining a pointer to the configuration information.

In operation 325, storage monitor VM 216 can store the sampled deduplication statistics in association with a storage ID of the storage device 120, and configuration information.

In operation 330, it can be determined whether the event received in operation 305 was a configuration change event. If so, then method 300 continues at operation 335, otherwise method 300 continues at operation 305.

In operation 335, storage monitor VM 216 can transmit the configuration change information to storage vendor service 140.

In operation 340, storage monitor VM 216, can optionally receive a projected analysis of the effect of the configuration change upon deduplication ratio of storage device 120, and other storage devices 120, as may be indicated in the change information. In an embodiment, the analysis is alternatively, or in addition, sent to a remote administrator client device 105, or other designated client device 110. In an embodiment, storage monitor VM 216 can forward the analysis to remote administrator client device 105 or other designated client device 110 on behalf of storage services vendor 140. Method 300 then continues at operation 305.

If in operation 310, it was determined that the event is not a configuration change event and not a sample statistics event, then the event was a periodic transmit statistics event wherein storage monitor VM 216 prepares to transmit deduplication information for a billing cycle to storage vendor services 140, and method 300 continues at operation 345.

In operation 345, storage monitor VM 216 can optionally process deduplication sample statistics for the billing cycle prior to transmission to storage services vendor 140. Processing can include computing an average deduplication ratio from the sample deduplication statistics for a particular customer and/or client device. In an embodiment, processing deduplication statistics for the billing cycle can include computing an average deduplication ratio for a particular data set of a customer or client device 110. In an embodiment, processing deduplication statistics can include determining a date/time of a configuration change and computing an average deduplication ratio achieved for a customer and/or client device 110 before, and after, the configuration change.

In operation 350, storage monitor VM 216 can transmit the customer ID, client device ID of client device 10, data set identifiers (if any), deduplication data, and configuration information data to storage services vendor 140. In an embodiment, this information can be transmitted without processing before transmission. Storage vendor services 140 can then process the transmitted data in accordance with customer policies, service agreements, etc.

In operation 355, storage monitor VM 216 can receive a storage utilization analysis from the predetermined period (billing cycle). In an embodiment, storage utilization analysis can include a cost of deduplication services performed by storage device 120. In an embodiment, the cost is based, at least in part, upon the deduplication ratio achieved for the customer and/or client device 110. In an embodiment, the cost and deduplication ratio achieved can be broken down by a customer-specified breakdown, such as by device, by department, by data set, by user, or other breakdown. Customer can use this information for determining department chargeback costs. In a "subscription" embodiment, cost can be expressed as a debit against a number of prepaid units of cost. In a "utility" embodiment, cost can be expressed in a relevant currency for the customer. In an embodiment, the analysis can be expressed in a currency that is relevant to a department receiving the chargeback for deduplication services. In an embodiment, storage monitor VM 216 can forward the analysis to remote administrator client device 105 and/or a designated client device 110. Method 300 continues at operation 305.

Figure 4A:
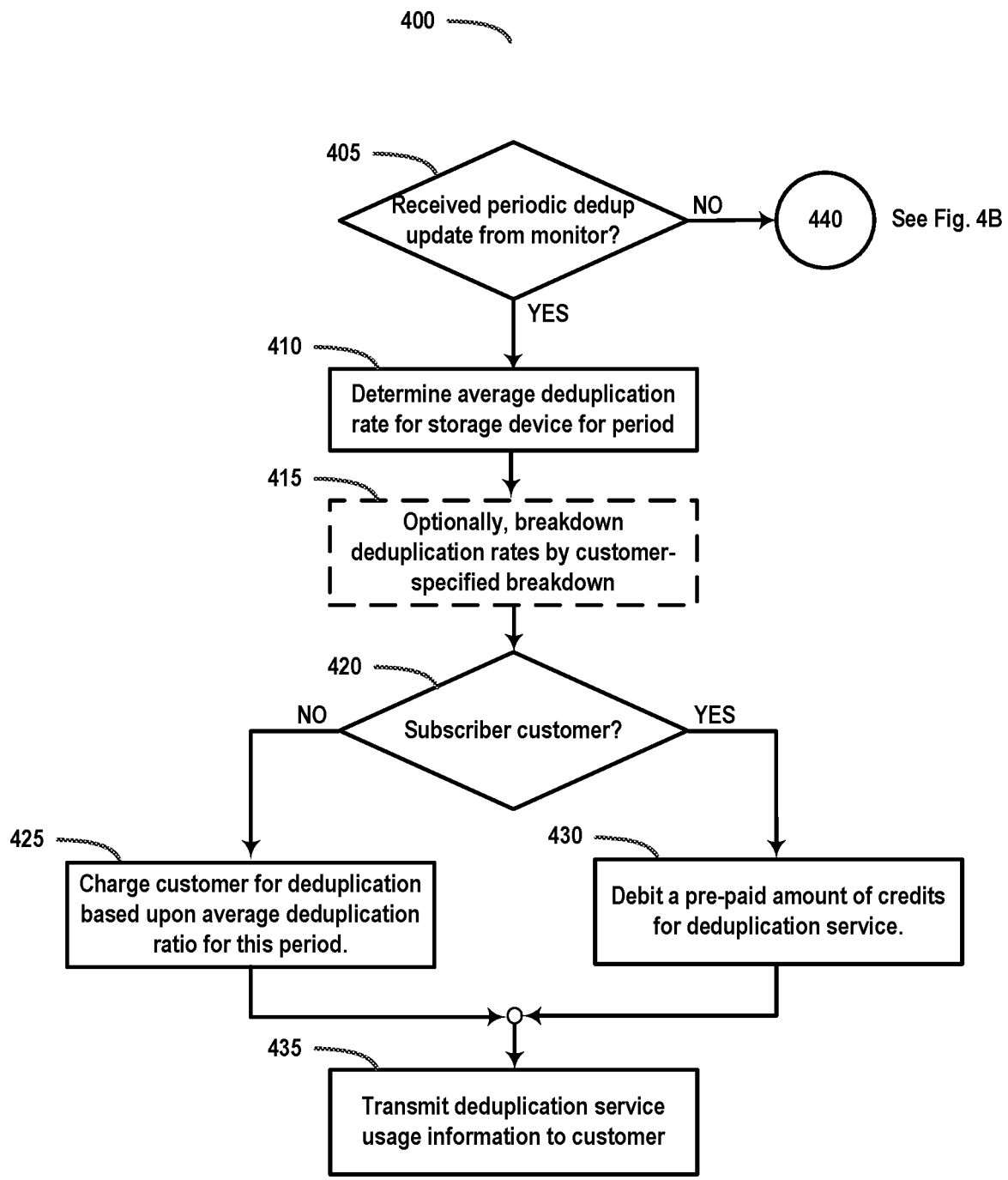
FIGS. 4A and 4B illustrate, in block diagram form, a method of a storage services vendor determining deduplication-based customer value, in accordance with some embodiments.
Figure 4B:
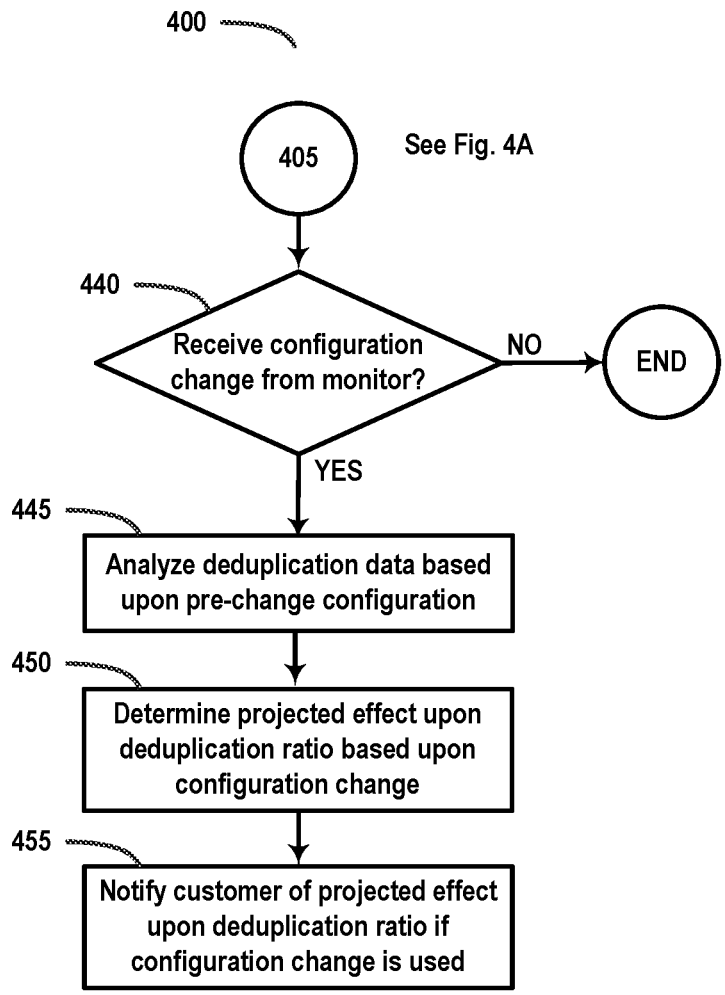

FIGS. 4A and 4B illustrate, in block diagram form, a method 400 of determining a deduplication-based customer value by a storage services vendor 140, in accordance with some embodiments. Storage services vendor 140 can receive at least two different types of information from a storage monitor VM 216 of client device 110. First, storage vendor services 140 can receive deduplication statistics and configuration information for a particular billing cycle, as described above in FIG. 3, operations 345-355. Storage services vendor can utilize this information to prepare a deduplication services analysis for a particular billing cycle of a customer. FIG. 4A describes this functionality of the storage services vendor 140. Second, storage services vendor 140 can receive configuration change information, as described in FIG. 3, operations 335. Configuration change information can be received by storage services vendor 140 at, or near, the time that storage monitor VM 216 receives the configuration change information. Configuration change information can be received mid-billing cycle by the storage services vendor 140. Storage services vendor 140 can utilize this information to inform a client device 110, or remote administrator client device 105, of the projected effect upon costs, deduplication ratio, and raw storage usage of the affected storage devices 120. FIG. 4B describes this functionality of storage services vendor 140.

In FIG. 4A, operation 405, it can be determined whether storage services vendor 140 has received (1) periodic deduplication data for a billing cycle from a client device 110, or (2) whether storage vendor services 140 has received configuration change information from client device 110. If it is determined that storage services vendor 140 has received periodic deduplication data from client device 110, then method 400 continues in FIG. 4A, at operation 410. Otherwise, method 400 continues in FIG. 4B at operation 440.

In operation 410, storage services vendor 140 determine an average deduplication ratio achieved during the billing cycle. In an embodiment wherein client device 110 storage monitor VM 216 forward unprocessed deduplication data to storage services vendor 140, storage services vendor 140 can process the received deduplication sample statistics. Processing can include computing an average deduplication ratio from the sample deduplication statistics for a particular customer and/or client device 110.

In operation 415, storage services vendor 140 can optionally process the received deduplication statistics in accordance with a customer-specific breakdown. In an embodiment, processing deduplication statistics can include computing an average deduplication ratio for a particular data set of a customer or client device 110. In an embodiment, processing deduplication statistics can include determining a date/time of a configuration change and computing an average deduplication ratio achieved for a customer and/or client device 110 before, and after, the configuration change.

In operation 420, it can be determined whether the customer is a subscriber customer or a utility customer. A subscriber customer can prepay for a predetermined amount of deduplication service credits. Deduplication service is debited against the credits in an amount based upon the deduplication ratio achieved for the customer and/or client device 110. A utility customer is billed for the cost of deduplication service in a relevant currency based upon the deduplication ratio achieved for the customer and/or client device 110.

If, in operation 420, it is determined that the customer is a subscriber customer, the method 400 continues at operation 430, otherwise method 400 continues at operation 425.

In operation 425, a subscriber customer is charged a debit amount against prepaid deduplication service credits in an amount based upon the deduplication ratio achieved by the storage device 120 during the billing cycle period. The higher the deduplication ratio achieved, the greater the debit. Method 400 continues at operation 435.

In operation 430, a utility customer is charged an amount in a relevant currency that is based upon the deduplication ratio achieved by the storage device 120 during the billing cycle period. The greater the deduplication ratio, the higher the cost.

In operation 435, storage services vendor 140 can transmit the deduplication service analysis and statement of account for the billing cycle to the storage monitor VM 216, remote administrator client device 105, or other designated client device 110.

In FIG. 4B, storage services vendor 140 has received configuration change information for a client device 110. Storage services vendor 140 can use previous deduplication analyses and the current configuration change information to project an effect upon deduplication ratio of one or more storage devices and a projected associated cost and raw storage usage.

In operation 440, it can be determined whether configuration change information has been received from client device 110 storage monitor VM 216. If not, then method 400 ends, otherwise method 400 continues at operation 445.

In operation 445, storage services vendor 140 can analyze deduplication data previously received from client device 110, stored in deduplication data 242 storage, and previously received configuration information from client device 110, stored in configuration data 243 storage. The analysis can determine an average deduplication ratio achieved under the pre-change configuration. Alternatively, average deduplication ratio can be determined from a previous billing cycle report stored in billing 244 storage.

In operation 450, storage services vendor 140 can estimate a projected deduplication ratio achievable under the changed configuration. In an example, a first storage device 120 used by client device 110 can have 100 virtual desktops with a presented data size of 0.5 TB total, a deduplication ratio of 10:1 for the 100 virtual desktops, and a raw data storage size of 0.05 TB. The configuration change information indicates that 50 virtual desktops are to be moved to a second storage device 120. Storage services vendor 140 can estimate that the deduplication ratio achievable on each of the first and second storage devices 120, after the configuration change, is 0.25 TB of presented data on each storage device 120, having a deduplication ratio of 7:1, and utilizing 0.036 TB of raw storage on each storage device.

In operation 455, storage services vendor 140 can notify the customer at the client device 110 storage monitor VM 216, or remote administrator client device 105, or other client device 110, of the projected effect on deduplication ratio, raw storage usage, and cost based upon the changed configuration of storage device 120 usage.

FIG. 5 illustrates, in block diagram form, an example deduplication-based customer value analysis 500 in accordance with some embodiments.

A storage vendor services 140 deduplication services analysis 500 for a predetermined period of time, e.g. Sep. 1, 2016 through Sep. 30, 2016, can include a customer ID 505, a storage ID 510 of a storage device 120 used by the customer, a size of presented data 520, a size of raw data 525 written after deduplication, and a deduplication ratio 530, for each of a plurality of storage uses, e.g. 535 and 540.

Storage usage item 535 describes presented data, raw data used and deduplication ratio for an email system. Storage usage item 540 describes presented data, raw data used and deduplication ratio for a legal department of the customer. The particular breakdown of a deduplication services analysis 500 can be specified on a per-customer basis.

Average deduplication service performed is summarized in total line 545, with 26.48 TB of presented data, 8.27 TB of raw data, and an average compression ratio of 3.20:1.

Figure 6:
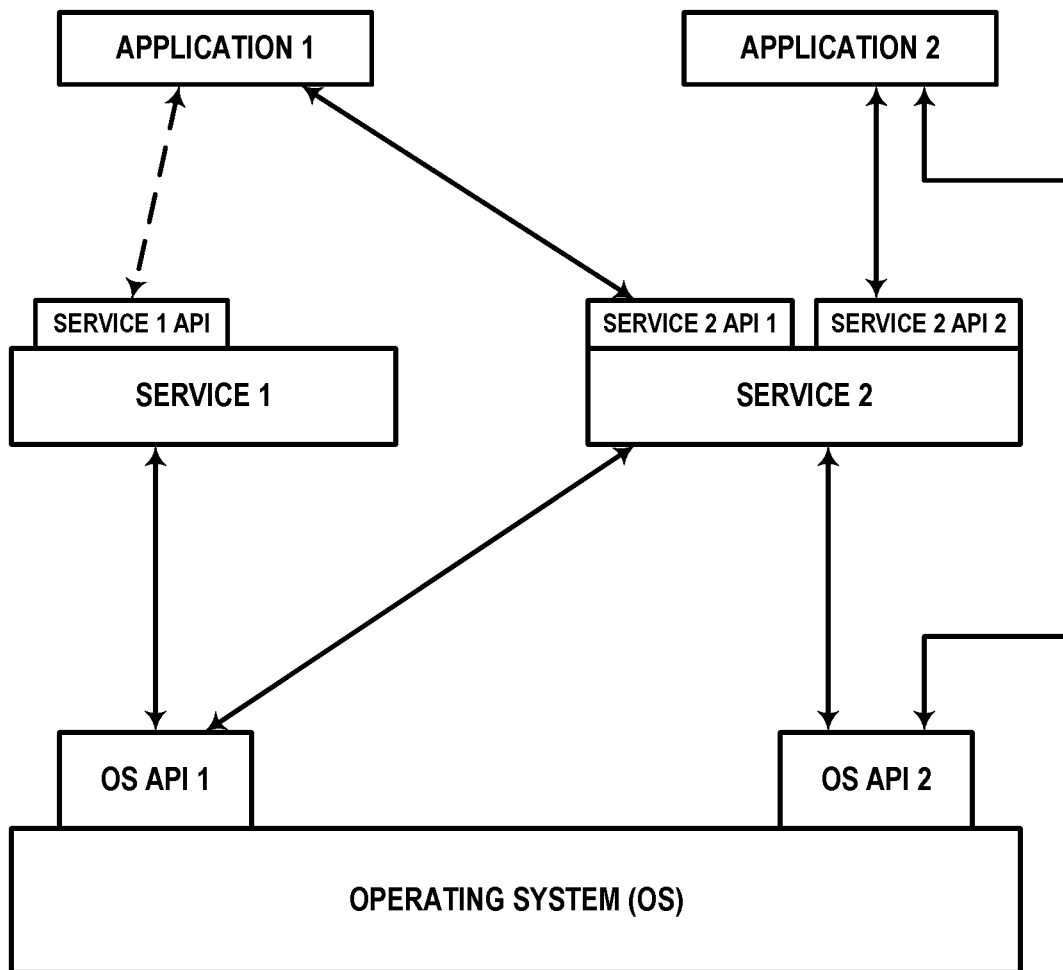
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
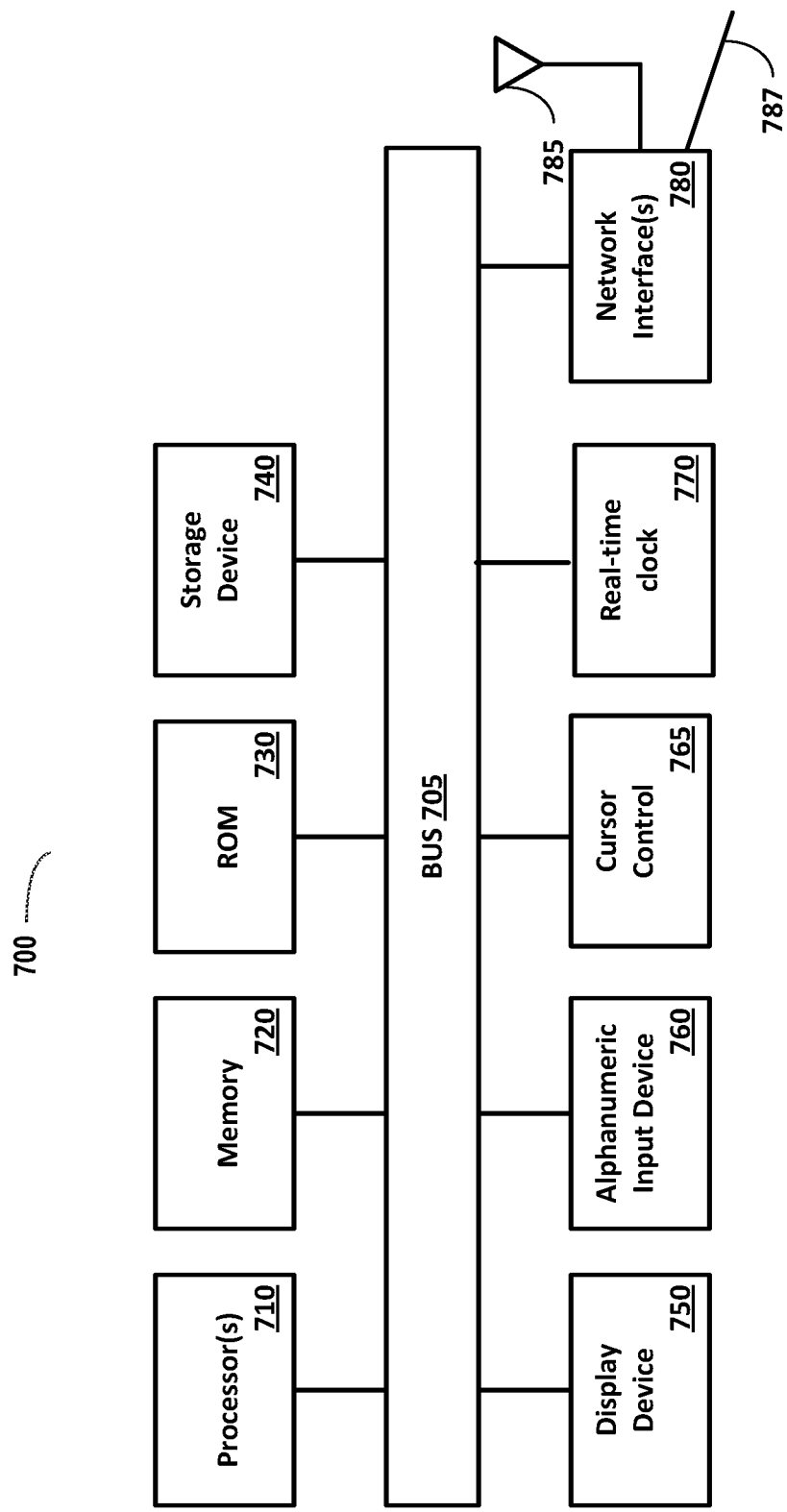
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a cathode ray tube (CRT), light-emitting diode display (LED), or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of determining an amount of deduplication service provided to a particular customer, wherein a deduplication ratio is determined by presented data, which is data that is presented to a storage system for storage, and raw data, which is the actual data stored after deduplication, the method comprising:
   receiving an indication that one or more client devices of a particular customer have undergone a configuration change affecting a deduplication ratio of a storage device;
   in response to receiving the indication that the one or more client devices have undergone the configuration change:
      polling the storage device having a storage ID for deduplication statistics generated since a previous event, the deduplication statistics associated with one or more client devices of the particular customer and includes amount of presented data and amount of resultant raw data written to storage after deduplication;
      receiving configuration information of the one or more client devices of the particular customer utilizing the storage device;
      storing the deduplication statistics in association with the storage ID, the particular customer, the predetermined period of time, and the configuration information;
   in response to an expiration of a predetermined period of time:
      processing the deduplication statistics and configuration information for the particular customer stored in response to the received events during the predetermined period of time; and
      transmitting the processed deduplication statistics and configuration information to a storage service;
   receiving a storage utilization analysis from the storage service for the predetermined period of time for the particular customer, wherein the storage utilization analysis includes:
      a rate of deduplication for each of a plurality of data sets;
      an overall deduplication rate for the particular customer for the predetermined period of time; and
      a projected effect of the configuration change upon the deduplication ratio.

2. The method of claim 1, wherein the transmitting the processed deduplication statistics and configuration information further comprises transmitting a customer ID and the storage ID to the storage service.

3. The method of claim 1 wherein processing deduplication statistics and configuration information comprises at least one of:
   determining an average deduplication ratio during the predetermined period of time;
   determining a change in deduplication ratio between events; or
   determining an effect of a change in configuration upon the average deduplication ratio for the predetermined rate for the period.

4. The method of claim 3, wherein the configuration change comprises one or more of:
   addition or deletion of an application data type to data being deduplicated by the storage device;
   adding one or more virtual desktops to the data being stored to the storage device; or
   moving one or more virtual desktops from the storage device to a different storage device.

5. The method of claim 4, further comprising:
   providing a notification to the particular customer indicating a forecasted change in the deduplication ratio based upon the configuration change.

6. The method of claim 1, wherein the storage utilization analysis comprises at least one of:
   a debit of a number of credits based at least in part upon an average deduplication ratio; or
   a cost charged based at least in part upon the average deduplication ratio.

7. A non-transitory computer readable medium programmed with instructions that, when executed by a processing system having at least one hardware processor, performs operations for determining an amount of deduplication service provided to a particular customer, wherein a deduplication ratio is determined by presented data, which is data that is presented to a storage system for storage, and raw data, which is the actual data stored after deduplication, the operations comprising:
   an indication that one or more client devices of a particular customer have undergone a configuration change affecting a deduplication ratio of a storage device;
   in response to receiving the indication that the one or more client devices have undergone the configuration change:
      polling the storage device having a storage ID for deduplication statistics generated since a previous event, the deduplication statistics associated with one or more client devices of the particular customer and includes amount of presented data and amount of resultant raw data written to storage after deduplication;
      receiving configuration information of the one or more client devices of the particular customer utilizing the storage device;
      storing the deduplication statistics in association with the storage ID, the particular customer, the predetermined period of time, and the configuration information;

in response to an expiration of a predetermined period of time:
processing the deduplication statistics and configuration information for the particular customer stored in response to the received events during the predetermined period of time; and
transmitting the processed deduplication statistics and configuration information to a storage service;
receiving a storage utilization analysis from the storage service for the predetermined period of time for the particular customer, wherein the storage utilization analysis includes:
a rate of deduplication for each of a plurality of data sets;
an overall deduplication rate for the particular customer for the predetermined period of time; and
a projected effect of the configuration change upon the deduplication ratio.

8. The medium of claim 7, wherein the transmitting the processed deduplication statistics and configuration information further comprises transmitting a customer ID and the storage ID to the storage service.

9. The medium of claim 7 wherein processing deduplication statistics and configuration information comprises at least one of:
determining an average deduplication ratio during the predetermined period of time;
determining a change in deduplication ratio between events; or
determining an effect of a change in configuration upon the average deduplication ratio for the predetermined rate for the period.

10. The medium of claim 9, wherein the configuration change comprises one or more of:
addition or deletion of an application data type to data being deduplicated by the storage device;
adding one or more virtual desktops to the data being stored to the storage device; or
moving one or more virtual desktops from the storage device to a different storage device.

11. The medium of claim 10, the operations further comprising:
providing a notification to the particular customer indicating a forecasted change in the deduplication ratio based upon the configuration change.

12. The medium of claim 7, wherein the storage utilization analysis comprises at least one of:
a debit of a number of credits based at least in part upon an average deduplication ratio; or
a cost charged based at least in part upon the average deduplication ratio.

13. A system comprising a memory and a processing system that includes at least one hardware processor, the memory programmed with instructions that, when executed by the processing system, performs for determining an amount of deduplication service provided to a particular customer, wherein a deduplication ratio is determined by presented data, which is data that is presented to a storage system for storage, and raw data, which is the actual data stored after deduplication, the operations comprising:
receiving an indication that one or more client devices of a particular customer have undergone a configuration change affecting a deduplication ratio of a storage device;
in response to receiving the indication that the one or more client devices have undergone the configuration change:
polling the storage device having a storage ID for deduplication statistics generated since a previous event, the deduplication statistics associated with one or more client devices of the particular customer and includes amount of presented data and amount of resultant raw data written to storage after deduplication;
receiving configuration information of the one or more client devices of the particular customer utilizing the storage device;
storing the deduplication statistics in association with the storage ID, the particular customer, the predetermined period of time, and the configuration information;
in response to an expiration of a predetermined period of time:
processing the deduplication statistics and configuration information for the particular customer stored in response to the received events during the predetermined period of time; and
transmitting the processed deduplication statistics and configuration information to a storage service;
receiving a storage utilization analysis from the storage service for the predetermined period of time for the particular customer, wherein the storage utilization analysis includes:
a rate of deduplication for each of a plurality of data sets
an overall deduplication rate for the particular customer for the predetermined period of time; and
a projected effect of the configuration change upon the deduplication ratio.

14. The system of 13, wherein the transmitting the processed deduplication statistics and configuration information further comprises transmitting a customer ID and the storage ID to the storage service.

15. The system of claim 13 wherein processing deduplication statistics and configuration information comprises at least one of:
determining an average deduplication ratio during the predetermined period of time;
determining a change in deduplication ratio between events; or
determining an effect of a change in configuration upon the average deduplication ratio for the predetermined rate for the period.

16. The system of claim 15, wherein the configuration change comprises one or more of:
addition or deletion of an application data type to data being deduplicated by the storage device;
adding one or more virtual desktops to the data being stored to the storage device; or
moving one or more virtual desktops from the storage device to a different storage device.

17. The system of claim 10, the operations further comprising:
providing a notification indicating a forecasted change in the deduplication ratio based upon the configuration change.

18. The system of claim 13, wherein the storage utilization analysis comprises at least one of:
a debit of a number of credits based at least in part upon an average deduplication ratio; or
a cost charged based at least in part upon the average deduplication ratio.

* * * * *